US010667008B1

(12) United States Patent
Cansino et al.

(10) Patent No.: US 10,667,008 B1
(45) Date of Patent: May 26, 2020

(54) METHOD AND SYSTEM FOR SETTING AND RECEIVING USER NOTIFICATIONS FOR CONTENT AVAILABLE FAR IN THE FUTURE

(71) Applicant: The DIRECTV Group, Inc., El Segundo, CA (US)

(72) Inventors: Don E. Cansino, Redondo Beach, CA (US); Brady C. Tsurutani, Los Angeles, CA (US); Earl J. Bonovich, Tinley Park, IL (US)

(73) Assignee: The DIRECTV Group, Inc., El Segundo, CA (US)

( * ) Notice: Subject to any disclaimer, the term of this patent is extended or adjusted under 35 U.S.C. 154(b) by 631 days.

(21) Appl. No.: 14/575,934

(22) Filed: Dec. 18, 2014

(51) Int. Cl.
| | | |
|---|---|---|
| H04N 21/00 | (2011.01) | |
| H04N 21/442 | (2011.01) | |
| H04L 29/08 | (2006.01) | |
| G06F 16/248 | (2019.01) | |
| H04N 21/482 | (2011.01) | |
| H04N 21/472 | (2011.01) | |
| G06F 16/738 | (2019.01) | |
| H04H 60/74 | (2008.01) | |
| H04H 60/72 | (2008.01) | |

(52) U.S. Cl.
CPC ..... *H04N 21/44222* (2013.01); *G06F 16/248* (2019.01); *G06F 16/739* (2019.01); *H04L 67/10* (2013.01); *H04N 21/472* (2013.01); *H04N 21/482* (2013.01); *H04H 60/72* (2013.01); *H04H 60/74* (2013.01); *H04N 21/4828* (2013.01)

(58) Field of Classification Search
None
See application file for complete search history.

(56) References Cited

U.S. PATENT DOCUMENTS

| | | | |
|---|---|---|---|
| 5,920,700 | A | 7/1999 | Gordon et al. |
| 5,974,567 | A | 10/1999 | Dickson et al. |
| 6,005,565 | A | 12/1999 | Legall et al. |

(Continued)

FOREIGN PATENT DOCUMENTS

| | | |
|---|---|---|
| EP | 0691787 A1 | 1/1996 |
| JP | 2003319271 | 11/2003 |

(Continued)

*Primary Examiner* — Diedra McQuitery
(74) *Attorney, Agent, or Firm* — Harness, Dickey & Pierce, P.L.C.

(57) ABSTRACT

A system and method comprises a head end performing a search using a search term and communicates a search result. The head end determines availability of the search result and when the search result is unavailable, communicates a notification function selector to a user device. The user device displays the search result and the notification function selector on a screen display. The user device generates a notification selector signal in response to a notification selector selection. The notification selector signal corresponds to the search or search result. The user device communicates the notification selector signal to a notification system. The notification system forms a notification query in response to the notification selector signal and monitors guide data at the notification system for content corresponding to the search or search result and communicates a notification signal to the user device in response to monitoring guide data.

22 Claims, 10 Drawing Sheets

(56) References Cited

U.S. PATENT DOCUMENTS

| | | | |
|---|---|---|---|
| 6,057,890 A | 5/2000 | Virden et al. |
| 6,199,049 B1 | 3/2001 | Conde et al. |
| 6,212,327 B1 | 4/2001 | Berstis et al. |
| 6,515,680 B1 | 2/2003 | Hendricks et al. |
| 6,564,996 B2 | 5/2003 | Hoffman et al. |
| 6,681,395 B1 | 1/2004 | Nishi |
| 6,714,722 B1 | 3/2004 | Tsukidate |
| 6,802,077 B1 | 10/2004 | Schlarb |
| 6,813,711 B1 | 11/2004 | Dimenstein |
| 6,820,277 B1 | 11/2004 | Eldering et al. |
| 6,922,845 B2 | 7/2005 | Yap et al. |
| 6,934,916 B1 | 8/2005 | Webb et al. |
| 6,968,364 B1 | 11/2005 | Wong et al. |
| 6,973,669 B2 | 12/2005 | Daniels |
| 7,027,716 B1 | 4/2006 | Boyle et al. |
| 7,051,277 B2 | 5/2006 | Kephart et al. |
| 7,055,165 B2 | 5/2006 | Connelly |
| 7,131,069 B1 | 10/2006 | Rush et al. |
| 7,240,358 B2 | 7/2007 | Horn et al. |
| 7,373,652 B1 | 5/2008 | Bayrakeri et al. |
| 7,543,325 B2 | 6/2009 | Westbrook et al. |
| 7,600,064 B2 | 10/2009 | Knowles et al. |
| 7,730,146 B1 | 6/2010 | Mace et al. |
| 7,788,701 B1 | 8/2010 | Lavin |
| 7,818,368 B2 | 10/2010 | Yang et al. |
| 7,992,179 B1 | 8/2011 | Kapner et al. |
| 8,005,419 B2 | 8/2011 | Patsiokas et al. |
| 9,948,989 B1* | 4/2018 | Hannum ......... H04N 21/25875 |
| 2002/0031097 A1 | 3/2002 | Jung |
| 2002/0032905 A1 | 3/2002 | Sherr et al. |
| 2002/0107802 A1 | 8/2002 | Philips |
| 2002/0129217 A1 | 9/2002 | Nichols |
| 2002/0143976 A1 | 10/2002 | Barker et al. |
| 2002/0144260 A1 | 10/2002 | Devara |
| 2002/0150387 A1 | 10/2002 | Kunii et al. |
| 2002/0166121 A1 | 11/2002 | Rovira |
| 2003/0005435 A1 | 1/2003 | Nelger et al. |
| 2003/0009758 A1 | 1/2003 | Townsend et al. |
| 2003/0009770 A1 | 1/2003 | Tantawy et al. |
| 2003/0030751 A1 | 2/2003 | Lupulescu et al. |
| 2003/0084449 A1 | 5/2003 | Chane et al. |
| 2003/0095791 A1 | 5/2003 | Barton et al. |
| 2003/0101456 A1 | 5/2003 | Park et al. |
| 2003/0135495 A1 | 7/2003 | Vagnozzi |
| 2003/0193519 A1 | 10/2003 | Hayes et al. |
| 2003/0206719 A1 | 11/2003 | Bumgardner et al. |
| 2003/0208763 A1 | 11/2003 | McElhatten et al. |
| 2003/0220100 A1 | 11/2003 | McElhatten |
| 2003/0221127 A1 | 11/2003 | Risan et al. |
| 2003/0221194 A1 | 11/2003 | Thiagarajan et al. |
| 2003/0223734 A1 | 12/2003 | Cooper, Jr. |
| 2004/0025185 A1 | 2/2004 | Goci et al. |
| 2004/0040041 A1 | 2/2004 | Crawford |
| 2004/0047599 A1 | 3/2004 | Grzeczkowski |
| 2004/0060063 A1 | 3/2004 | Russ et al. |
| 2004/0103280 A1 | 5/2004 | Balfanz et al. |
| 2004/0117831 A1 | 6/2004 | Ellis et al. |
| 2004/0148638 A1 | 7/2004 | Weisman et al. |
| 2004/0213557 A1 | 10/2004 | Krakirian et al. |
| 2004/0237100 A1 | 11/2004 | Pinder et al. |
| 2004/0266336 A1 | 12/2004 | Patsiokas et al. |
| 2004/0268410 A1 | 12/2004 | Barton et al. |
| 2005/0014463 A1 | 1/2005 | Shin |
| 2005/0021609 A1 | 1/2005 | Houghton et al. |
| 2005/0028208 A1 | 2/2005 | Ellis et al. |
| 2005/0031099 A1 | 2/2005 | Iggulden et al. |
| 2005/0055716 A1 | 3/2005 | Louie et al. |
| 2005/0108769 A1 | 5/2005 | Arnold et al. |
| 2005/0125528 A1 | 6/2005 | Burke et al. |
| 2005/0138654 A1 | 6/2005 | Minne |
| 2005/0160458 A1 | 7/2005 | Baumgartner |
| 2005/0165784 A1 | 7/2005 | Gomez et al. |
| 2005/0177853 A1 | 8/2005 | Williams et al. |
| 2005/0188402 A1 | 8/2005 | de Andrade et al. |
| 2005/0193425 A1 | 9/2005 | Sull et al. |
| 2005/0228806 A1 | 10/2005 | Haberman |
| 2005/0229212 A1 | 10/2005 | Kuether et al. |
| 2005/0235316 A1 | 10/2005 | Ahmad-Taylor |
| 2005/0240968 A1 | 10/2005 | Knudson et al. |
| 2005/0251558 A1 | 11/2005 | Zaki |
| 2005/0278760 A1 | 12/2005 | Dewar et al. |
| 2006/0031833 A1 | 2/2006 | Huang et al. |
| 2006/0031883 A1 | 2/2006 | Ellis et al. |
| 2006/0037043 A1 | 2/2006 | Kortum et al. |
| 2006/0037048 A1 | 2/2006 | DeYonker et al. |
| 2006/0041910 A1 | 2/2006 | Hatanaka et al. |
| 2006/0101496 A1 | 5/2006 | Syed |
| 2006/0107285 A1 | 5/2006 | Medvinsky |
| 2006/0143690 A1 | 6/2006 | Lin et al. |
| 2006/0156372 A1 | 7/2006 | Cansler et al. |
| 2006/0190963 A1 | 8/2006 | Wagner et al. |
| 2006/0195441 A1 | 8/2006 | Julia et al. |
| 2006/0212906 A1 | 9/2006 | Cantalini |
| 2006/0257123 A1 | 11/2006 | Horozov et al. |
| 2006/0271950 A1 | 11/2006 | Kim et al. |
| 2006/0271973 A1 | 11/2006 | Jerding et al. |
| 2006/0287916 A1 | 12/2006 | Starr et al. |
| 2007/0056042 A1 | 3/2007 | Qawami et al. |
| 2007/0061336 A1 | 3/2007 | Ramer et al. |
| 2007/0107016 A1 | 5/2007 | Angel et al. |
| 2007/0112772 A1 | 5/2007 | Morgan et al. |
| 2007/0118857 A1 | 5/2007 | Chen et al. |
| 2007/0124776 A1 | 5/2007 | Welk et al. |
| 2007/0124779 A1* | 5/2007 | Casey ............... H04N 7/17318 725/87 |
| 2007/0124781 A1 | 5/2007 | Casey et al. |
| 2007/0174336 A1 | 7/2007 | Day |
| 2007/0174888 A1 | 7/2007 | Rubinstein |
| 2007/0199040 A1 | 8/2007 | Kates |
| 2007/0294254 A1 | 12/2007 | Yao |
| 2008/0059884 A1 | 3/2008 | Ellis |
| 2008/0066135 A1 | 3/2008 | Brodersen et al. |
| 2008/0075285 A1 | 3/2008 | Poli et al. |
| 2008/0077506 A1 | 3/2008 | Rampell et al. |
| 2008/0086456 A1 | 4/2008 | Rasanen et al. |
| 2008/0109306 A1 | 5/2008 | Maigret et al. |
| 2008/0148322 A1 | 6/2008 | Howcroft |
| 2008/0155600 A1 | 6/2008 | Klappert et al. |
| 2008/0155607 A1 | 6/2008 | Klappert |
| 2008/0163307 A1 | 7/2008 | Coburn et al. |
| 2008/0168516 A1 | 7/2008 | Flick et al. |
| 2008/0192820 A1 | 8/2008 | Brooks et al. |
| 2008/0195664 A1 | 8/2008 | Maharajh et al. |
| 2008/0235746 A1* | 9/2008 | Peters ............... H04N 7/17318 725/111 |
| 2008/0242221 A1 | 10/2008 | Shapiro et al. |
| 2008/0263600 A1 | 10/2008 | Olague et al. |
| 2008/0270395 A1* | 10/2008 | Gossweiler, III ...... G06F 16/489 |
| 2008/0276284 A1 | 11/2008 | Bumgardner et al. |
| 2008/0301732 A1* | 12/2008 | Archer ............... H04N 21/252 725/40 |
| 2009/0013034 A1 | 1/2009 | Cheng et al. |
| 2009/0028087 A1 | 1/2009 | Nguyen et al. |
| 2009/0028331 A1 | 1/2009 | Millar et al. |
| 2009/0031345 A1* | 1/2009 | Vagnati ............... H04N 7/17318 725/39 |
| 2009/0037961 A1 | 2/2009 | Green et al. |
| 2009/0043984 A1 | 2/2009 | Chang et al. |
| 2009/0077096 A1 | 3/2009 | Ohama et al. |
| 2009/0099858 A1 | 4/2009 | Jeffs |
| 2009/0199230 A1 | 8/2009 | Kumar et al. |
| 2009/0240912 A1 | 9/2009 | Wakrat et al. |
| 2009/0293098 A1* | 11/2009 | Pirani ............... H04N 7/17318 725/132 |
| 2009/0320084 A1 | 12/2009 | Azam et al. |
| 2010/0030814 A1 | 2/2010 | Wong et al. |
| 2010/0063877 A1 | 3/2010 | Soroca et al. |
| 2010/0162324 A1 | 6/2010 | Mehta et al. |
| 2010/0186038 A1* | 7/2010 | Thomas ............ H04N 21/47202 725/42 |
| 2010/0205397 A1 | 8/2010 | Chellam |
| 2010/0250892 A1 | 9/2010 | Logan et al. |
| 2011/0202269 A1 | 8/2011 | Reventlow |

(56) References Cited

U.S. PATENT DOCUMENTS

| | | | |
|---|---|---|---|
| 2011/0202956 A1* | 8/2011 | Connelly | H04N 21/433 725/38 |
| 2011/0289522 A1* | 11/2011 | Pontual | H04N 21/23895 725/1 |
| 2011/0296456 A1* | 12/2011 | Pandala | H04N 5/44543 725/34 |
| 2013/0332953 A1* | 12/2013 | Howcroft | H04N 21/2747 725/34 |
| 2014/0040955 A1* | 2/2014 | McKissick | H04N 5/44513 725/40 |

FOREIGN PATENT DOCUMENTS

| | | |
|---|---|---|
| JP | 2004080194 | 3/2004 |
| WO | 92/11713 A1 | 7/1992 |
| WO | 02/069636 A1 | 9/2002 |
| WO | 2004064296 A | 7/2004 |
| WO | 2005/081523 A1 | 9/2005 |
| WO | 2006104968 A | 10/2006 |
| WO | 2007086941 A1 | 8/2007 |
| WO | 2007132165 A1 | 11/2007 |
| WO | 2008/016611 A2 | 2/2008 |

\* cited by examiner

METHOD AND SYSTEM FOR SETTING AND RECEIVING USER NOTIFICATIONS FOR CONTENT AVAILABLE FAR IN THE FUTURE

TECHNICAL FIELD

The present disclosure relates generally to television systems and, more specifically, to a method and system for controlling a user receiving device using a wearable device.

BACKGROUND

The statements in this section merely provide background information related to the present disclosure and may not constitute prior art.

Television programming content providers are increasingly providing a wide variety of content to consumers. Available content is typically displayed to the user using a grid guide. The grid guide typically includes channels and timeslots as well as programming information for each information timeslot. The programming information may include the content title and other identifiers such as actor information and the like.

Providing convenient ways for users to select and find content is useful to content providers. Mobile phones are have been used to order content and watch content. Wearable devices such as computer watches and head mounted computers are increasing in popularity. Utilizing such devices in the control of content would increase customer satisfaction. However, sometimes content is not yet available or is currently unavailable. Consumers learn about shows or movies months in advance from news reports. Search engines merely return no results for such content. This can be frustrating for consumers when they know content will be released in the future.

SUMMARY

The present disclosure provides a system and method for generating a notification when content is available. This allows customers to search and save the search or search results until the content is available.

In one aspect of the disclosure, a method comprises performing a search using a search term, generating a search result in response to the search term, determining availability of content corresponding to the search result and when the search result is unavailable, generating a notification selector on a screen display of a user device. The method further comprises generating a notification selector signal at the user device in response to selecting the notification selector, said notification selector signal comprising the search term or search result, communicating the notification selector signal to a notification system located remotely from the user device, forming a notification query in response to the notification selector signal, monitoring guide data at the notification system for content corresponding to the search term or search result and communicating a notification signal to the user device in response to monitoring guide data.

In yet another aspect of the disclosure, a system comprises a head end performing a search using a search term and communicates a search result. The head end determines availability of the search result and when the search result is unavailable, communicates a notification function selector to a user device. The user device displays the search result and the notification function selector on a screen display.

The user device generates a notification selector signal in response to a notification selector selection. The notification selector signal corresponds to the search or search result. The user device communicates the notification selector signal to a notification system. The notification system forms a notification query in response to the notification selector signal and monitors guide data at the notification system for content corresponding to the search or search result and communicates a notification signal to the user device in response to monitoring guide data.

Further areas of applicability will become apparent from the description provided herein. It should be understood that the description and specific examples are intended for purposes of illustration only and are not intended to limit the scope of the present disclosure.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
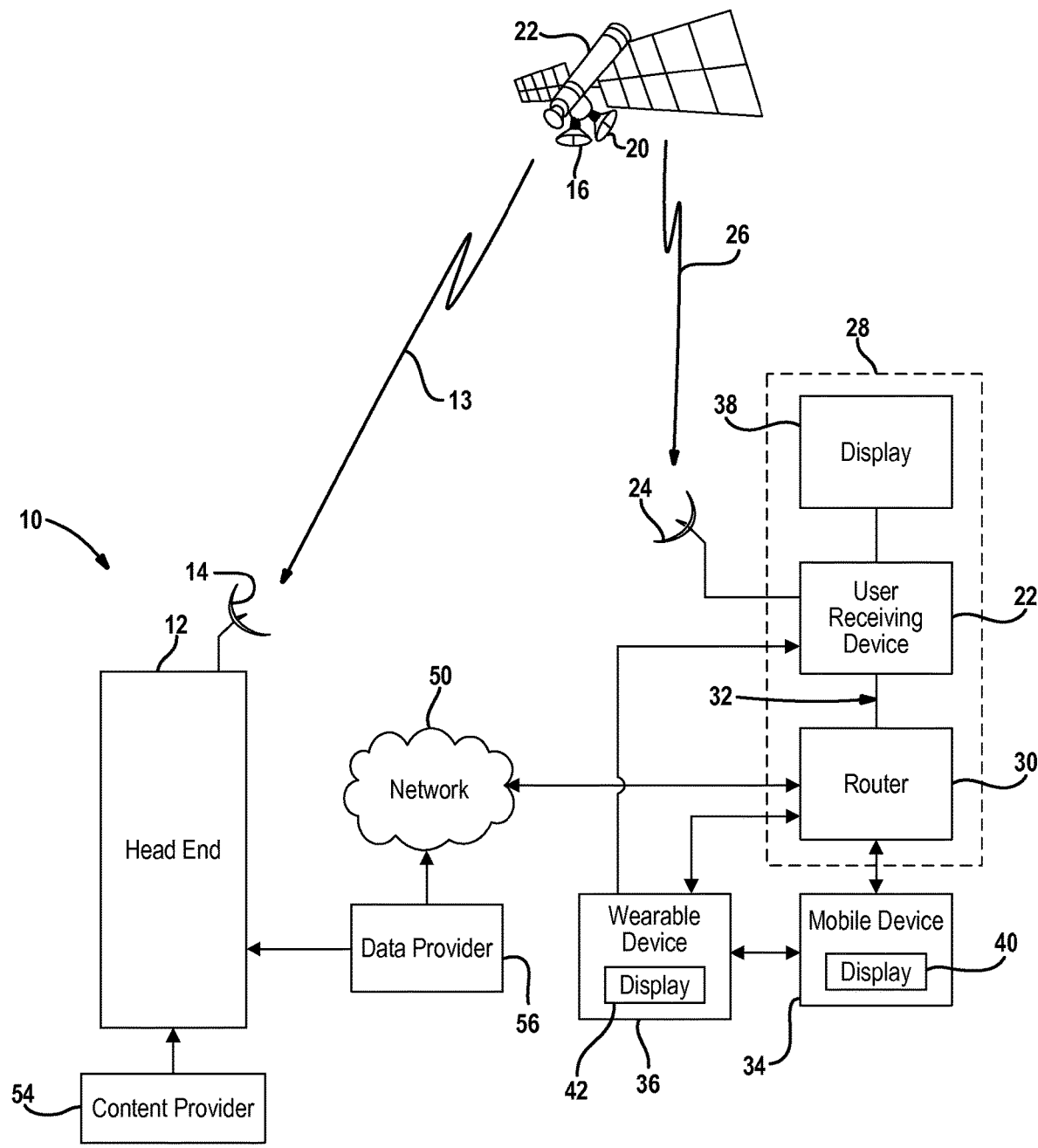
FIG. 1 is a block diagrammatic view of a communication system according to one example of the present disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented in analog circuitry, digital circuitry or combinations thereof. Further, the computing device may include a microprocessor or microcontroller that performs instructions to carry out the steps performed by the various system components.

A content or service provider is also described. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie. While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Referring now to FIG. 1, a satellite television broadcasting system 10 is illustrated. The satellite television broadcast system 10 includes a head end 12 that generates wireless signals 13 through an antenna 14 which are received by an antenna 16 of a satellite 18. The wireless signals 13, for example, may be digital. The wireless signals 13 may be referred to as an uplink signal. A transmitting antenna 20 generates downlink signals 26 that are directed to a user receiving device 22. The user receiving device 22 may be located within a building 28 such as a home, multi-unit dwelling or business. The user receiving device 22 is in communication with an antenna 24. The antenna 24 receives downlink signals 26 from the transmitting antenna 20 of the satellite 18. Thus, the user receiving device 22 may be referred to as a satellite television receiving device. However, the system has applicability in non-satellite applications such as a wired or wireless terrestrial system. Therefore the user receiving device 22 may be referred to as a television receiving device or set top box. More than one user receiving device 22 may be included within a system or within a building 28. The user receiving devices 22 may be interconnected.

The user receiving device 22 may be in communications with a router 30 that forms a local area network 32 with a mobile device 34 and a wearable device 36. The router 30 may be a wireless router or a wired router or a combination of the two. For example, the user receiving device 22 may be wired to the router 30 and wirelessly coupled to the mobile device 34 and to the wearable device 36. The router 30 may communicate internet protocol (IP) signals to the user receiving device 22. The IP signals may be used for controlling various functions of the user receiving device 22. IP signals may also originate from the user receiving device 22 for communication to other devices such as the mobile device 34 or the wearable device 36 through the router 30. The mobile device 34 and the wearable device 36 may also communicate signals to the user receiving device 22 through the router 30.

The mobile device 34 may be a mobile phone, tablet computer, laptop computer or any other type of computing device.

The wearable device 36 may be one of a number of types of wearable devices that are worn by a user. The wearable device 36 may be fixed wearable by a user meaning it is meant to be fixed to the user. Examples of wearable devices 36 include a computerized watch such as a Samsung® or Apple® watch. The watch devices are fixed to an arm of the user. Another example of a wearable device 36 is GOOGLE GLASS® which is fixed to a head of a user. Of course, other types of wearable devices affixed to other parts of the body may be used. The wearable device 36 may be in direct communication with the user receiving device 22 and the mobile device 34 through a Bluetooth® connection. The wearable device 36 may also be in communication with the user receiving device 22 and the mobile device 34 through an IP connection through the router 30. The wearable device 36 may also be in communication with devices outside the local area network 32 through the router 30. That is, the wearable device 36 may communicate with other devices such as the head end 12 through the network 50. The wearable device 36 may also be in communication with the mobile device 34 which provides a bridge or a communication path to the router 30 and ultimately to the user receiving device 22 or the network 50. The wearable device 36 may generate signals such as selection signals that are communicated through the mobile device 34 but are destined to be used by the user receiving device 22, the head end 12 or other user devices in communication with the network 50.

The wearable device 36 may be in communication with the mobile device 34 by way of a Bluetooth® connection. The mobile device 34 may, in turn, be in communication with the router 30 and various other devices, such as the user receiving device 22 or devices through the network 50 such as the head end 12 or other devices in other parts of the network.

The user receiving device 22 includes a screen display 38 associated therewith. The display 38 may be a television or other type of monitor. The display 38 may display both video signals and audio signals.

The mobile device 34 may also have a display 40 associated therewith. The display 40 may also display video and audio signals. The display 40 may be integrated into the mobile device. The display 40 may also be a touch screen that acts as at least one user interface. Other types of user interfaces on the mobile devices may include buttons and switches.

The wearable device 36 may also have a display 42 associated therewith. The display 42 may also display video and audio signals. The display 42 may be integrated into the wearable device 36. A projected display or user interface may also be projected on a surface adjacent to the eye of a user. The display 42 may also be a touch screen that acts as at least one user interface such as in a wearable watch type device. The device 36 may display function selectors or "buttons" that are other types of user interfaces on the wearable devices may include buttons and switches.

The user receiving device 22 may be in communication with the head end 12 through an external network or simply, network 50. The network 50 may be one type of network or multiple types of networks. The network 50 may, for example, be a public switched telephone network, the internet, a mobile telephone network or other type of network. The network 50 may be in communication with the user receiving device 22 through the router 30. The network 50 may also be in communication with the mobile device 34 through the router 30. Of course, the network 50 may be in direct communication with the mobile device 34 or wearable device 36 such as in a cellular system.

The system 10 may also include a content provider 54 that provides content to the head end 12. Although only one content provider 54 is illustrated, more than one content provider may be used. The head end 12 is used for distributing the content through the satellite 18 or the network 50 to the user receiving device 22, mobile device 34 or the wearable device 36.

A data provider 56 may also provide data to the head end 12. The data provider 56 may provide various types of data such as schedule data or metadata that is provided within the program guide system. The metadata may include various descriptions, actor, director, star ratings, titles, user ratings, television or motion picture parental guidance ratings, descriptions, related descriptions and various other types of data. The data provider 56 may provide the data directly to the head end and may also provide data to various devices such as the mobile device 34, wearable device 36, and the user receiving device 22 through the network 50. This may be performed in a direct manner through the network 50.

Figure 2:
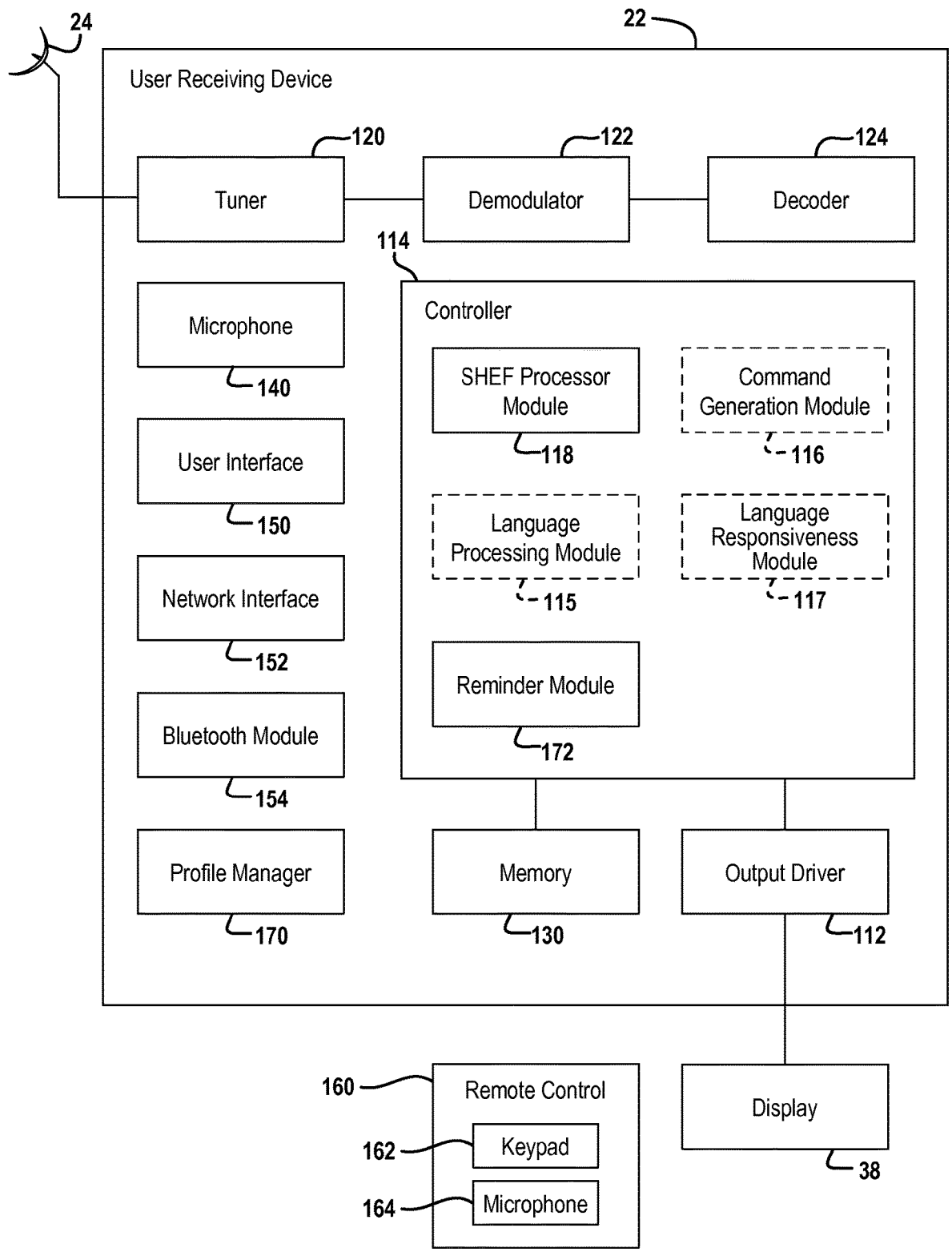
FIG. 2 is a block diagrammatic view of a user receiving device according to one example of the present disclosure.

Referring now to FIG. 2, a user receiving device 22, such as a set top box is illustrated in further detail. Although, a particular configuration of the user receiving device 22 is illustrated, it is merely representative of various electronic devices with an internal controller used as a content receiving device. Each of the components illustrated may be capable of communicating therebetween even though a physical line is not drawn.

The antenna 24 may be one of a number of different types of antennas that includes one or more low noise blocks. The antenna 24 may be a single antenna 24 used for satellite television reception. The user receiving device 22 is in communication with the display 38. The display 110 may have an output driver 112 within the user receiving device 22.

A controller 114 may be a general processor such as a microprocessor that cooperates with control software. The controller 114 may be used to coordinate and control the various functions of the user receiving device 22. These functions may include a tuner 120, a demodulator 122, a decoder 124 such as a forward error correction decoder, a buffer or other functions. The controller 114 may also be used to control various function of the user receiving device 22.

The controller 114 may also include one or more of a language processing module 115, a command generation module 116, a language responsiveness module 117 and a set-top box HTTP export functionality (SHEF) processor module 118. Each of these modules is an optional feature of the user receiving device 22. As will be described below the functions associated with each of the modules 115-118 may be performed in the user receiving device or one of the other devices such as the head end or the mobile device or a combination of the three. The modules 115-118 may be located remotely from each other and may also be stand-alone devices or vendors on the network 50. In general, the language processing module 115 converts electrical signals that correspond to audible signals into a textual format or textual signal. The command generation module 116 determines a user receiving device control command that corresponds with the textual signal. The language responsiveness module 117 is used to train the system to recognize various commands.

The SHEF processor module 118 is used to receive SHEF commands and translate the SHEF commands into actual control signals within the user receiving device. Various types of SHEF commands for controlling various aspects of the user receiving device may be performed. The SHEF processor module 118 translates the hypertext transfer protocol signals received through the network into control signals within the user receiving device 22. Tuning and initiating a recording are examples of SHEF commands.

The tuner 120 receives the signal or data from the individual channel. The tuner 120 may receive television programming content, program guide data or other types of data. The demodulator 122 demodulates the signal or data to form a demodulated signal or data. The decoder 124 decodes the demodulated signal to form decoded data or a decoded signal. The controller 114 may be similar to that found in current DIRECTV® set top boxes which uses a chip-based multifunctional controller. Although only one tuner 120, one demodulator 122 and one decoder 124 are illustrated, multiple tuners, demodulators and decoders may be provided within a single user receiving device 22.

The controller 114 is in communication with a memory 130. The memory 130 is illustrated as a single box with multiple boxes therein. The memory 130 may actually be a plurality of different types of memory including the hard drive, a flash drive and various other types of memory. The different boxes represented in the memory 130 may be other types of memory or sections of different types of memory. The memory 130 may be non-volatile memory or volatile memory.

The memory 130 may include storage for content data and various operational data collected during operation of the user receiving device 22. The memory 130 may also include advanced program guide (APG) data. The program guide data may include various amounts of data including two or more weeks of program guide data. The program guide data may be communicated in various manners including through the satellite 18 of FIG. 1. The program guide data may include a content or program identifiers, and various data objects corresponding thereto. The program guide may include program characteristics for each program content. The program characteristic may include ratings, categories, actor, director, writer, content identifier and producer data. The data may also include various user profiles such as other settings like parental controls.

The memory 130 may also include a digital video recorder. The digital video recorder 132 may be a hard drive, flash drive, or other memory device. A record of the content stored in the digital video recorder 132 is a playlist. The playlist may be stored in the DVR 132 or a separate memory as illustrated.

The user receiving device 22 may include a voice converter such as a microphone 140 in communication with the controller 114. The microphone 140 receives audible signals and converts the audible signals into corresponding electrical signals. Typically, this is done through the use of a transducer or the like. The electrical signal corresponding to the audible may be communicated to the controller 114. The microphone 140 is an optional feature and may not be included in some examples as will be described in detail below. The electrical signal may also be process in a remotely located language processing module. Thus, the controller 114 may convert the electrical signal into a ".wav" file or other suitable file type suitable for communication through a network 50.

The user receiving device 22 may also include a user interface 150. The user interface 150 may be various types or combinations of various types of user interfaces such as but not limited to a keyboard, push buttons, a touch screen or a remote control. The user interface 150 may be used to select a channel, select various information, change the volume, change the display appearance, or other functions. The user interface 150 may be used for generating a selection signal for selecting content or data on the display 40.

A network interface 152 may be included within the user receiving device 22 to communicate various data through the network 50 illustrated above. The network interface 152 may be a WiFi, WiMax, WiMax mobile, wireless, cellular, or other types of communication systems. The network interface 152 may use various protocols for communication therethrough including, but not limited to, hypertext transfer protocol (HTTP).

A Bluetooth® module 154 may send and receive Bluetooth® signals to or from the mobile device or wearable device.

A remote control device 160 may be used as a user interface for communicating control signals to the user receiving device 22. The remote control device may include a keypad 162 for generating key signals that are communicated to the user receiving device 22. The remote control device may also include a microphone 164 used for receiving an audible signal and converting the audible signal to an electrical signal. The electrical signal may be communicated to the user receiving device 22.

The user receiving device 22 may also include a profile manager 170. The profile manager 170 may use various profiles for operating and generating displays of the user receiving device. For example, the user receiving device 22 may have various users associated therewith. Each user may have a user data such as a profile that is used to operate the device to provide a customized user experience. The profiles may be used to set various operations of the user receiving device 22 such as, but not limited to, a list of favorite channels, a list of operational settings of the user receiving device, a recorded program playlist, and recommendation characteristics. The recommendation characteristics may be stored while the user is associated with the user receiving device by tuning or recording various programming. User profiles may be changed in response to the user's actions at the user receiving device 22. The user settings may be established for the language, the parental controls, and other user established settings. By storing any user established settings or adjustments, a profile can easily configure the user receiving device and provide a consistent user experience without the user having to provide inputs by scrolling through various menus at each television watching experience.

The profile manager module 170 may receive the various user data or profiles that are stored within the memory 130. The user profiles may also be stored within the head end and communicated to the user receiving device. A new user may have a user profile or user data communicated from the head end or always communicated from the head end when the user is identified to the user receiving device. As will be mentioned below, the user may be identified to the user receiving device 22 through a user identifier such as a numerical code, a user name, or an identifier associated with a mobile or wearable user receiving device.

A reminder module 172 may also be included within the controller of the user receiving device 22. The reminder module 172 may be associated with a time clock or other device for generating a reminder set by a user. The reminder module 172 may generate a screen display on the display 38 or generate a signal communicated to the wearable device 36 that corresponds to a reminder and provides various choices, such as record or tune, to the user.

A search module 174 may also be included within the user receiving device. The search module 174 may be used to perform various searches for program guide content that is stored within the memory 130 of the user receiving device. The search module 174 may allow searches to be performed by a mobile or wearable device. However, if the content is not available at the user receiving device, when comparing the content to the program guide data, other options for the user to save the search, search results or the query may be allowed. The profile manager 170 may also include data about the user devices associated with the account. Mobile phones, tablets, and other computing devices may be registered with the user receiving device. This may allow notifications to be generated.

The generation of notifications may also take place using the head end as set forth below.

Figure 3:
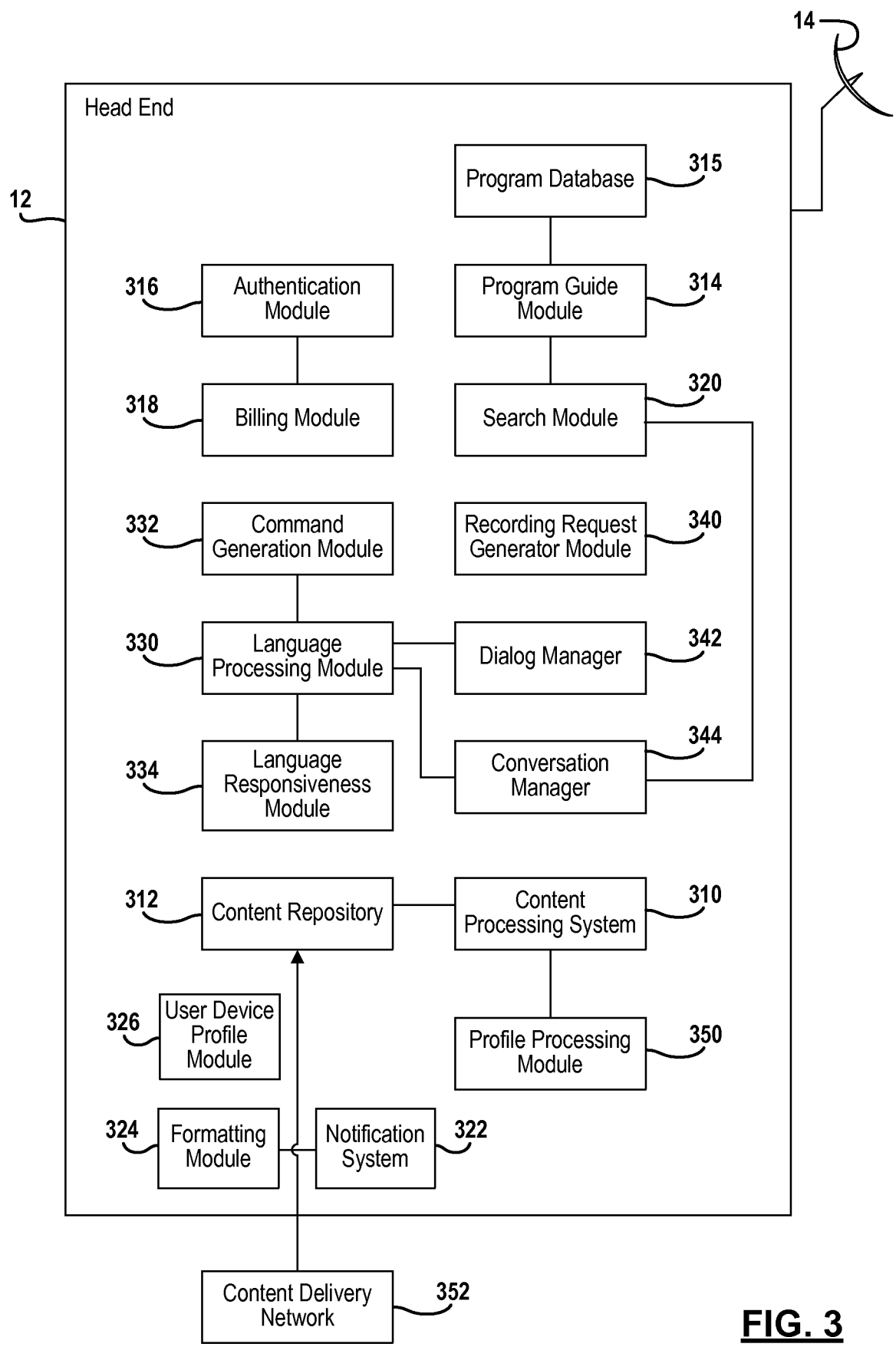
FIG. 3 is a block diagram of a head end according to one example of the present disclosure.

Referring now to FIG. 3, the head end 12 is illustrated in further detail. The head end 12 may include various modules for intercommunicating with the mobile device 34 and the user receiving device 22 illustrated in FIG. 1. Only a limited number of interconnections of the modules are illustrated in the head end 12 for drawing simplicity. Other interconnections may, of course, be present in a constructed example. The head end 12 receives content from the content provider 54 illustrated in FIG. 1. A content processing 310 processes the content for communication through the satellite 18. The content processing system 310 may communicate live content as well as recorded content. The content processing system 310 may be coupled to a content repository 312 for storing content therein. The content repository 312 may store and process On-Demand or Pay-Per-View content for distribution at various times. The Pay-Per-View content may be broadcasted in a linear fashion (at a predetermined time according to a predetermined schedule). Linear content is presently broadcasting and may also be scheduled in the future. The content repository 312 may also store On-Demand content therein. On-Demand content is content that is broadcasted at the request of a user receiving device and may occur at any time (not on a predetermined schedule). On-Demand content is referred to as non-linear content.

The head end 12 also includes a program guide module 314 and a program database 315. The program guide module 314 communicates program guide data to the user receiving device 22 illustrated in FIG. 1. The program guide module 314 may create various objects that are communicated with various types of guide data therein. The guide data is searchable data that may be compared to search terms. The program guide module 314 may, for example, include schedule data, genre, actors, ratings, various types of descriptions for the content and content identifier that uniquely identifies each content item. The program guide module 314, in a typical system, communicates up to two weeks of advanced guide data for linear content to the user receiving devices. The guide data includes but is not limited to tuning data such as time of broadcast, end time, channel, and transponder to name a few. Guide data may also include content available on-demand and pay-per-view content.

The program database 315 may also include guide data for past or future content. The guide data and program data may therefore be for currently unavailable content. The program data may not be as detailed as guide data. For example, only a title or some limited data may be provided.

An authentication module 316 may be used to authenticate various user receiving devices, mobile devices and wearable devices that communicate with the head end 12. The authentication module 316 may be in communication with a billing module 318. The billing module 318 may provide data as to subscriptions and various authorizations suitable for the user receiving devices, the mobile devices and wearable devices that interact with the head end 12. The authentication module 316 ultimately permits the user receiving devices and mobile devices to communicate with the head end 12. Authentication may be performed by providing a user identifier, a password, a user device identifier or combinations thereof.

A search module 320 may also be included within the head end 12. The search module 320 may receive a search query comprising one or more search terms from various devices such as a mobile device or user receiving device. The search module 320 may search guide data and other program data of the program guide module by comparing search terms to the program data and or guide data. The search module 320 may communicate search results to one of the user receiving device or the mobile device. The search results are a content title or plurality of content titles that correspond to the search term. The search module 320 may interface with the program guide module 314, the program database or the content processing system 310 or all three to determine search result data. The search results may also be personalized according to personal profiles, user data and viewing habits.

The search module 320 may also return no results that are currently available. That is, the results are not able to be immediately available to buy, rent, download or the like. However, search results may be retrieved for content that will be available in the future. The unavailable content data may be obtained from the program database. For example, a movie may not be currently being broadcasted, but the movie is a known movie. The search module 320 may therefore return the data regarding the movie, but may also provide the option of generating a notification selector. The notification selector may be communicated with the search results to be displayed on a screen display of a user device. The notification selector may be disposed adjacent to a content title indicator or other content indicia. The notification selector may be selected to form a notification selector signal that is communicated to a notification system 322.

The notification system 322 may receive the notification selector signal that is generated at the user device. The notification selector signal may be communicated through a local area network or another network such as a mobile telephone network. When the notification system 322 receives the notification selector signal, a notification is established in the notification system 322. The notification system 322 establishes a notification query that is saved and is used to monitor the program guide data. The notification selector signal may include a user identifier as well as data regarding the type of notification that is to be established by the notification query. The content title (or other content specific indicia), search terms and search results could be saved.

A formatting module 324 may be in communication with the notification system 322. The formatting module 324 may format the notification signal that is communicated from the head end 12 to a user device. Various formats may be available as will be described in more detail below. E-mails, text messages or on-screen notifications in the case of a set-top box may all be generated by the formatting module 324. The formatting module 324 may obtain data from a user device profile module 326. The user device profile module 326 may be part of the billing module 318. When a customer establishes account data, a user may also associate different types of devices with which the user may interact with the head end 12. The user device profile 326 may be established at the time of establishing a customer account. Also, the user device profile 326 may also be on-going in that when a user acquires a new device and signs into the head end through an authentication process, the types of user devices may be updated in the user device profile 326.

When the notification signal is communicated from the notification system 322 to the user device, the payload associated therewith may launch an application to the program details of the show or provide the program details. Function selectors may also be displayed with the program data. This allows the user to select various options such as tuning, buying, recording, or commanding a user receiving device, such as a set-top box, to tune and/or record the content.

The head end 12 may also include a language processing module 330. The language processing module 330 may be used to generate text signals from electrical signals that correspond to audible signals received through the network 50 from a mobile device 34 or user receiving device 22 illustrated in FIG. 1. The language processing module 330 may also be or include a voice converter. The language processing module 330 may communicate the text signals to a command generation module 332. The command generation module 332 generates a user receiving device control command that corresponds to the textual signal generated by the language processing module 330. The command generation module may include various variations that correspond to a particular command. That is, people speak in various ways throughout the country and various regions. Accents and other language anomalies may be taken into consideration within the command generation module 332. Details of this will be described further below.

The head end 12 may also include a language responsiveness module 334 that is used to improve the responsiveness of the language processing module 330 and the command generation module 332. The language responsiveness module 334 is a learning mechanism used to recognize various synonyms for various commands and associate various synonyms with various commands. The details of the language responsiveness module 334 will be described in greater detail below.

The head end 12 may also include a recording request generator module 340. Various signals may be communicated from a mobile device 34 illustrated in FIG. 1, or another networked type computing device. A request to generate a recording may be communicated to the head end 12 and ultimately communicated to the user receiving device 22. The recording request may include a user receiving device identifier and a time to initiate recording. Other data that may be included in the recording request may include a channel, a transponder, a start time, an end time, a content delivery network identifier such as an IP address and various other types of identifiers that allow the user receiving device 22 to tune and record the desired content.

The head end 12 may also include a dialog manager 342. The dialog manager 342 is used to generate a corrected text response such as a sentence in response to a search request. The corrected text response may be a grammatically corrected text response. The grammatically correct text response may be based on a classification that is derived from the received text of the original audible signal. The grammatically correct text response may also be provided in a voice signal that may be played back at the receiving device. An audible signal may be useful in a mobile device where text may not easily be reviewed without being distracted from other tasks. As will be described below, templates may be used in the dialog manager based upon identified data from the original audible request. The output of the dialog manager 342, because of the grammatical correctness, may be easily be read and understood by the user of the device to which the results are returned.

The head end 12 may also include a conversation manager 344. The conversation manager is used to determine whether a second search request is related to a previous first search request. As will be mentioned in detail below, the conversation manager 344 determines whether intents or mentions within the search request are related. The conversation manager starts a new context when the second search is not related to the first search.

The head end 12 may include a profile processing module 350. The profile processing module 350 may receive a user identifier, a device identifier or both to identify a user. The user experience of a wearable device or a set top box may be changed based upon the characteristics of a user. The profile processing module 350 may provide user characteristics to a set top box or other user receiving device 22 through the network. The profile processing module may store various types of data, including a favorite channel list, a playlist and parental settings. The profile processing module 350 may also store identifiers corresponding to content watched so that recommendations may be provided to the user. As content is watched, the content identifier and the user identifier may be communicated to the head end and stored therein. Recommendations may thus be generated for a particular user that corresponds to content of interest to the user. The head end 12 may thus store profile data or user data for all of the system users so that the profile data may be distributed to various devices when necessary.

The search module 320, language processing module 330, the command generation module 332, the language responsiveness module 334, the dialog manager 342, the conversation manager 344 and the profile processing module 350 are illustrated by way of example for convenience within the head end 12. As those skilled in the art will recognize, these modules 320-350 may also be located in various other locations together or remote to/from each other including outside the head end 12. The network 50 may be used to communicate with modules 320-350 located outside the head end 12.

A content delivery network 352 may be in communication with a content repository 312. The content delivery network 352 is illustrated outside of the head end 12. However, the content delivery network 352 may also be included within the head end 12. The content delivery network 352 may be managed or operated by external vendors other than the operators of the head end 12. The content delivery network 352 may be responsible for communicating content to the various devices outside of the head end 12

Figure 4:
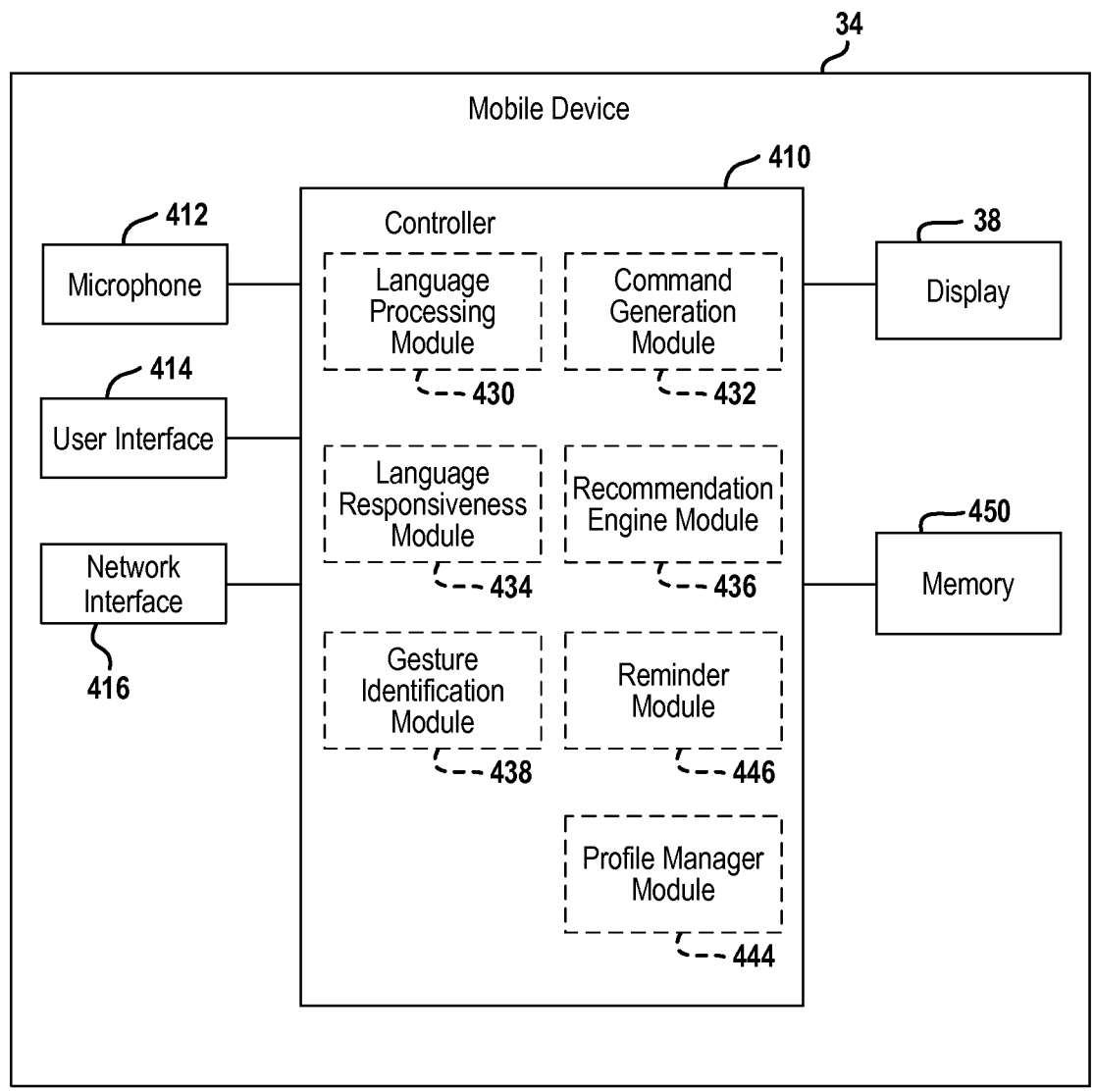
FIG. 4 is a block diagram of a mobile device according to one example of the present disclosure.

Referring now to FIG. 4, the mobile device 34 is illustrated in further detail. The mobile device 34 includes a controller 410 that controls the various functions therein. The controller 410 is in communication with a microphone 412 that receives audible signals and converts the audible signals into electrical signals. The audible signals may include a request signal. The request signal may be to perform a search, obtain guide data network data or playlist data.

The controller 410 is also in communication with a user interface 414. The user interface 414 may be buttons, input switches or a touch screen. The user interface 414 may be used for selecting function selector or entering search terms, for example.

A network interface 416 is also in communication with the controller 410. The network interface 416 may be used to interface with the network 50. As mentioned above, the network 50 may be a wireless network or the internet. The network interface 416 may communicate with a cellular system or with the internet or both. A network identifier may be attached to or associated with each communication from the mobile device so that a determination may be made by another device as to whether the mobile device and the user receiving device are in the same local area network.

The controller 410 may also be in communication with the display 40 described above in FIG. 1.

The controller 410 may also include a language processing module 430, a command generation module 432 and a language processing module 434. Modules 430, 432 and 434 are optional components. That is, command generation and language responsiveness may be performed in remote locations such as external to the mobile device. Each of the head end 12, the user receiving device 22 or the mobile device 34 may optionally include one or more language processing module, command generation module or language responsiveness module. Also, as mentioned above, none of the devices may include the modules. Rather, the modules may be interconnected with the network 50 without residing in the head end, the user receiving device or the mobile device. Variations of this will be provided in the example set forth below.

A recommendation engine 436 may also be included within the controller 410. The recommendation engine 436 may have various data that is stored in a memory 450 of the mobile device 34. For example, selected content, content for which further data was sought, and recorded content may all be stored within the memory 450. The recommendation engine 436 may provide recommendations obtained whose content data or metadata has been obtained from the head end 12. The recommendations may be tailored to the interests of the user of the mobile device. The recommendation engine 436 may communicate the data such as the selected content, the content for which data was sought, the recorded content and the like to the head end and, in particular, the profile processing module 350.

The controller 410 may also include a gesture identification module 438 that identifies gestures performed on the display 38. For example, the gestures may be a move of dragging the user's finger up, down, sideways or holding in a location for a predetermined amount of time. A gesture performed at a certain screen may be translated into a particular command.

A profile manager 444 may store user profile data within the mobile device. The profile manager 444 may store user settings, such as favorites and parental controls. The profile manager 444 may also save relative to the recommendation engine 436 for each individual user of the mobile device. The profile manager 444 may also receive profile data from the profile processing module 350 of the head end 12 through the network. The profile manager 444 may also store data corresponding to the type of mobile device. For example, a type of device such as brand, model, formats may all be stored.

A reminder module 446 may also be included within the controller 410 of the mobile device 34. The reminder module 446 may be associated with a time clock or other device for generating a reminder set by a user. The reminder module 446 may generate a screen display on the display 38 that corresponds to a reminder and provides various choices, such as record or tune, to the user.

Figure 5:
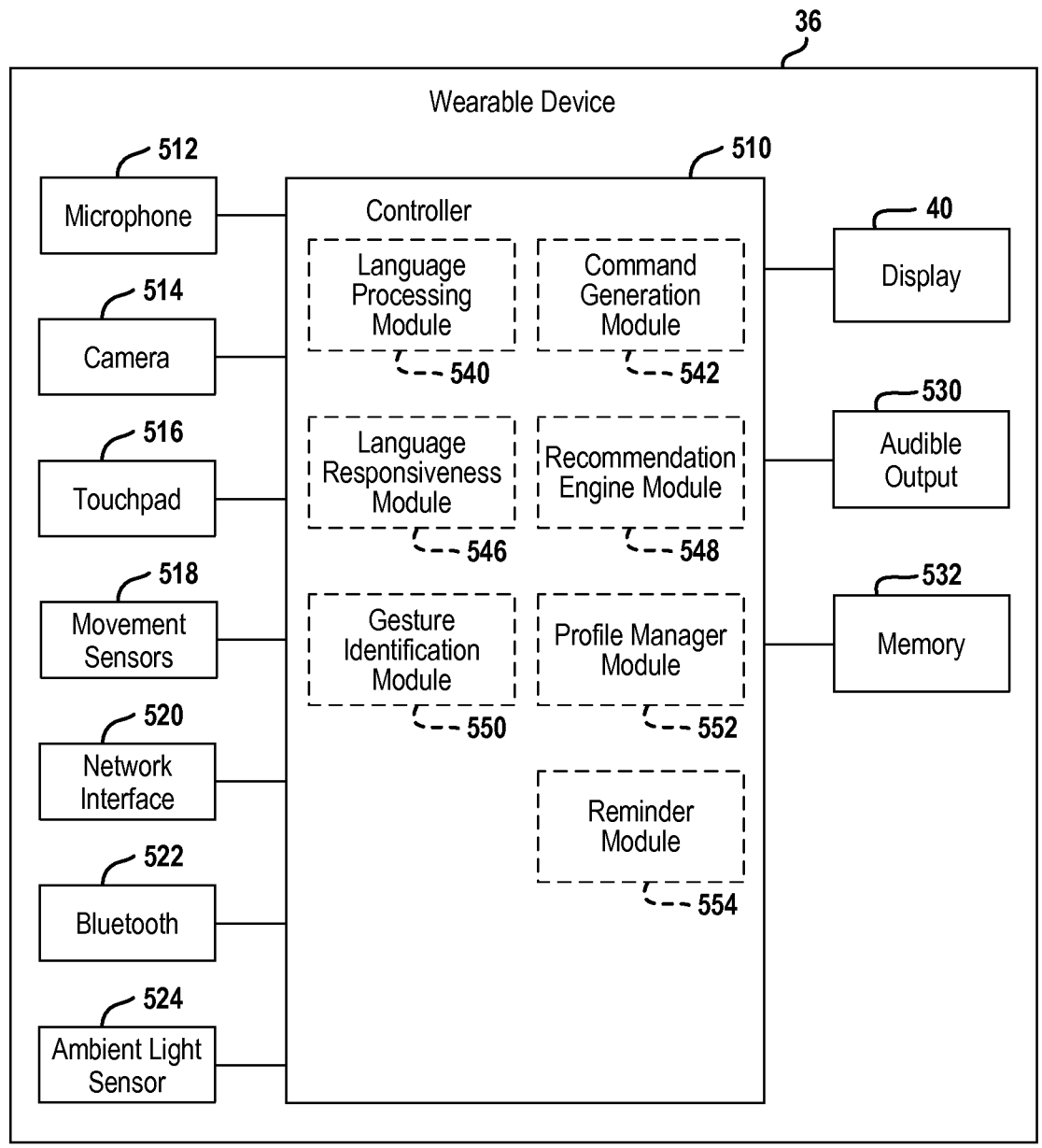
FIG. 5 is a block diagram of a wearable device according to one example of the present disclosure.

Referring now to FIG. 5, a block diagrammatic view of wearable device 36 is set forth. As mentioned above, the wearable device 36 may be one of a number of types of wearable devices including a computerized watch or wrist worn device, a head worn device such as GOOGLE GLASS® or another type of computerized device suitable to be worn or affixed to the user. The wearable device 36 may include a microphone 512 that receives audible signals and converts the audible signals into electrical signals. A camera 514 generates digital signals from a camera input. A touchpad 516 provides digital signals corresponding to the touch of a hand or finger. The touchpad 516 may sense the movement of a finger or other user input. The wearable device 36 may also include a movement sensor 518 that provides signals corresponding to movement of the device. Physical movement of the device may also correspond to an input. The movement sensors 518 may include accelerometers and moment sensors that generate signals that allow the device to know the relative movement.

The wearable device 36 may also include a network interface 520. The network interface 520 provides input and output signals to a wireless network, such as the internet. The network interface may also communicate with a cellular system.

A Bluetooth® module 522 may send and receive Bluetooth® formatted signals to and from the controller 510 and communicated them external to the wearable device 36.

An ambient light sensor 524 generates a signal corresponding to the ambient light. The ambient light sensor 524 generates a digital signal that corresponds to the amount of ambient light around the wearable device 36.

The controller 510 may also be in communication with the display 40 an audio output 530 and a memory 532. The audible output 530 may generate an audible signal through a speaker or other device. Beeps and buzzers to provide the user with feedback may be generated. The memory 532 may be used to store various types of information including a user identifier, a user profile, a user location and user preferences. Of course other operating parameters may also be stored within the memory 532.

The controller 510 may include various modules that correspond to the modules set forth in the mobile device in FIG. 4. The language processing module 540, the command generation module 542, the language responsiveness module 546, the recommendation engine module 548, the gesture identification module 550, the profile manager module 552 and the reminder module 554 correspond to the functions of the language processing module 430, the command generation module 432, the language responsiveness module 534, the recommendation engine module 436, the gesture identification module 438, the profile manager module 444 and the reminder module 446 of FIG. 4. The functions of these elements will not be repeated again.

Figure 6:
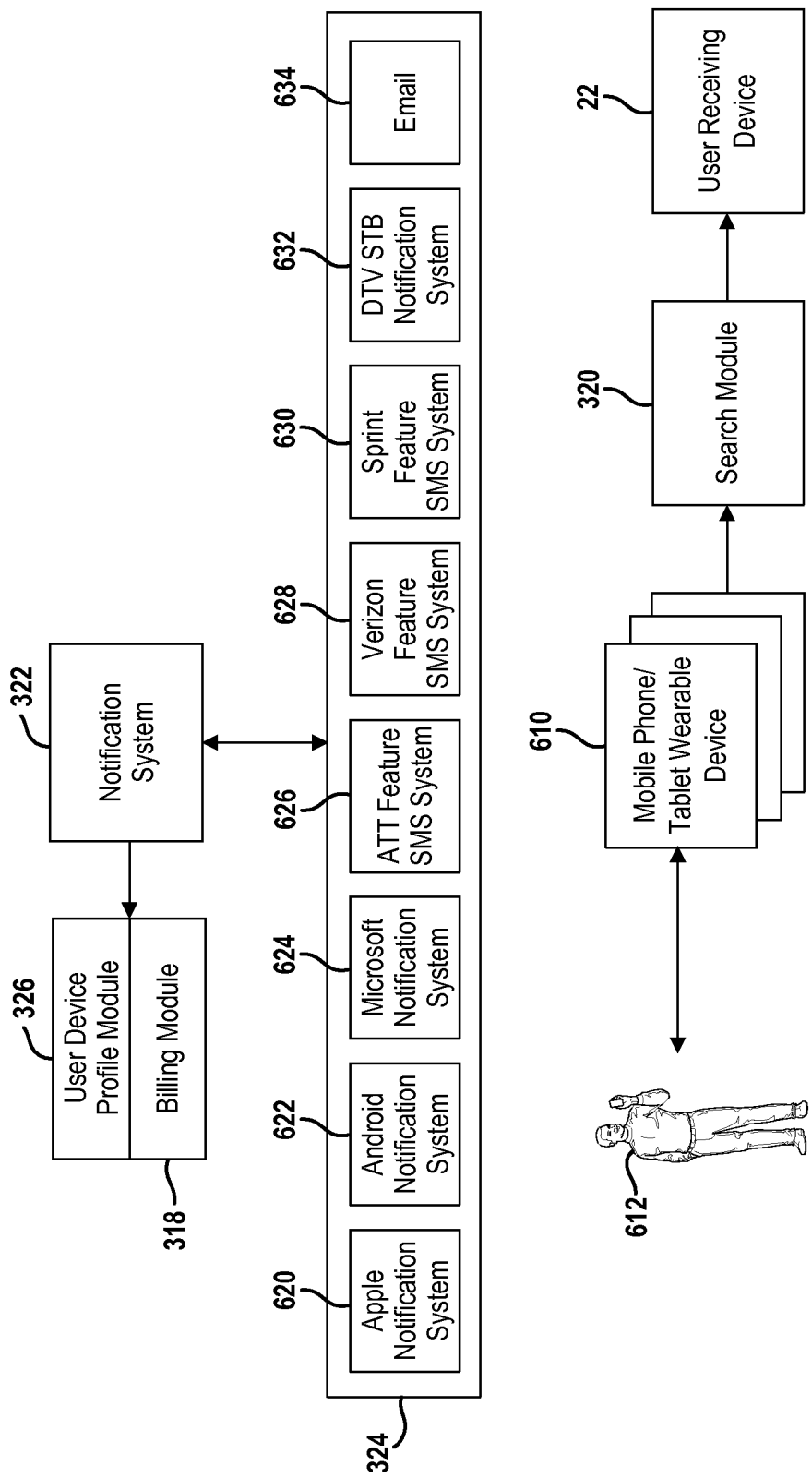
FIG. 6 is a simplified block diagrammatic view of the notification system.

Referring now to FIG. 6, a simplified view of the various modules that interact to perform notifications to a user is set forth. The formatting module 324 of FIG. 3 is illustrated in further detail. In this example, a user device 610 is meant to refer to any one or more of the wearable devices or mobile devices. As mentioned above, the user device may be a mobile phone, a tablet, a laptop computer, a wearable device or other types of portable wireless devices. The user device 16 may also be in communication with the user receiving device 22. As mentioned above, one example of a user receiving device is a set-top box.

When a user 612 interacts with a user device 610 to search for content (or at least the data associated with the content), the search module 320 may return search results or a lack of search results. The search module determines the availability of search results. When at least some of the search results are unavailable, a notification signal may be displayed on a screen display of a user device. This allows the user 612 to interact with the user device 610 to establish a notification. Examples of the function selectors and notification selectors are set forth below. In short, if a particular content is currently not available, a notification may be established for the particular content. If the user would like to have the search performed in the future, a notification may also be established for that. If a given program is unavailable, a notification may also be set up for the program. A notification selector is generated on a screen display and ultimately communicated to the notification system 322. The notification system 322 may save a notification query therein. The notification query may provide search results or re-perform a search in the future. The search query stored within the notification system may also have an expiration date so that the system does not endlessly have search queries built up therein. Notification queries may be valid for a predetermined amount of type, such as six months or one year, for example.

The formatting module 324 includes a plurality of different types of formatting systems for communicating notifications to the user device 610. For example, an Apple® notification system 620, an Android® Notification System 622, a Microsoft® Notification System 624, an ATT® Feature SMS system 626, a Verizon® Feature SMS System 628, a Sprint® Feature SMS System 630, a DIRECTV® set-top box notification system 632 and an e-mail system 634 may all be incorporated into the formatting module 324. Of course, the types of systems within the formatting module and the number of systems within the formatting module 324 may vary.

The notification system 322 may be in communication with the user device profile module 326. When a notification is due to be generated, the user device profile module provides user device data to the notification system 322 so that a proper format for the notification may be provided. The user device may associate various types of devices with the account when the account is established. The account may be established by the billing module 318. Updates to the types of user devices may also be provided by the user.

Figure 7:
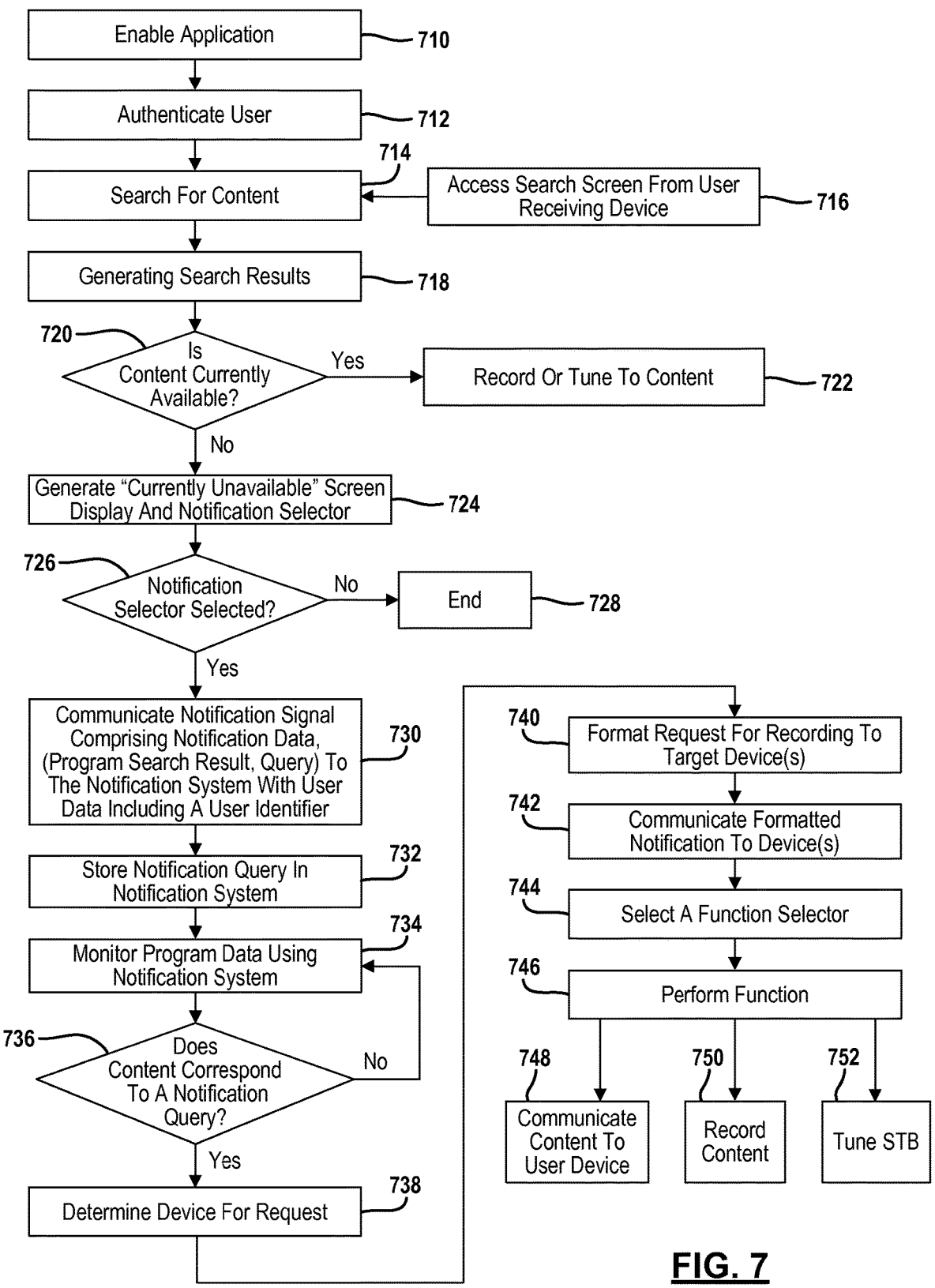
FIG. 7 is a flowchart of a method for operating the notification system.

Referring now to FIG. 7, a method for generating notifications is set forth. The system may be accessed through a set-top box or user receiving device or a mobile device. In the case of a mobile device, an application or "app" may be enabled at the mobile device in step 710. The user may be authenticated by entering a password, a user identifier, or both and communicating the password and/or identifier to a head end for authentication purposes. In step 712, the user is authenticated. Thereafter, a search may be performed for content. As will be described below, searching for content may take place using various means including entering words or letters, or speaking various words which are converted to text for searching.

Referring now to step 716, a notification may also be generated from a user receiving device such as a set-top box. In step 716, a search screen is accessed from a user receiving device. After the search screen is accessed, words, numbers or other search terms may be entered.

Referring back to step 714, after step 712 and 716, content may be searched. In step 720, search results are generated. The search results may be generated by reviewing the contents of the program guide and program database 315. After a search, not all of the contents may be available. In step 720, it is determined whether the content is available. If content is available, step 722 the display of the user device may display function selectors to the user to allow the user to record or tune to the content. In step 720, if content is not available, a currently unavailable screen display and notification selector may be generated. In step 726, if a notification selector is not selected in step 728, the system ends the process. When the notification selector is selected in step 726. Step 730 communicates a notification signal comprising notification data, such as program data, search data, or queries to the notification system along with user data including a user identifier. In step 732, a notification query is stored in the notification system. The notification query, as mentioned above, may include a time limit such as six months or a year for providing notifications to a user. After step 732, step 734 monitors program data using the notification system. Both programming guide data and a programming database may be monitored in this process. In step 736, when the content does not correspond to a request during the monitoring process, the system performs step 734 again which monitors the program data based on the notification query.

In step 736, when the content corresponds to a notification query, step 738 determines the user devices from user device profile module that are to receive the notification. In step 740, the notification signal is formatted according to the target device or devices. More than one notification signal may be generated in response to content corresponding to a notification query. The notification signal is communicated to the device or devices in step 742. The notification may take place through a wireless network such a mobile telephone network. Further, if a user device is a user receiving device, notification may take place using a conditional access packet that is transmitted through the satellite. The notification signal may include a payload that may include an application launcher and program details. Functions selected may also be communicated to the payload. The type of function selectors may vary. As will be described below, a recording function selector, a tuning function selector, or other types of selectors may be set forth.

In step 746, a function selector is selected at the user device. In step 748-752, a function is performed at the user device in response to selecting a selector. Typically one function 748-752 may be performed. It should be also be noted that a signal may be communicated to the head end in response to the selector such as in the instant of streaming the content from the content repository or content delivery network in step 748. The function performed may also be used to communicate a conditional access packet to a user receiving device such as a set-top box to allow the set-top box to record content in step 750 by tuning to the content at a predetermined time and record the content within the user receiving device. The content may also be purchased in this process by communicating a purchase signal to the billing system and associating the costs with the billing system and the user account. When the user receiving device is within the same network as the mobile device, tuning the set-top box may be performed in step 752. This may be performed by communicating a SHEF signal from the user device to the user receiving device such as the set top box.

Figure 8A:
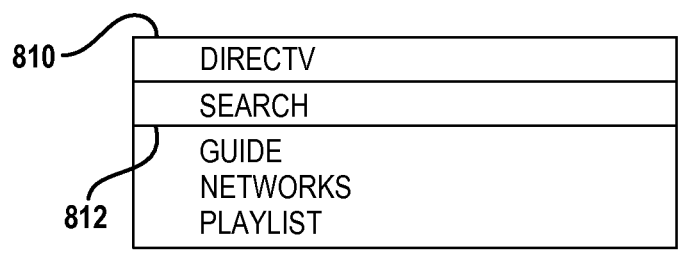
FIG. 8A is a screen display illustrating choices for entering the notifications and search system.

Referring now to FIG. 8A, a screen display 810 displayed at a wearable or mobile device is set forth. The display 810 may have several options including search, guide, networks and a playlist. A search selection box 812 is illustrated around the "search" entry. The searching may be performed by selecting the search command, through a user interface or voice command at the wearable device.

Figure 8B:
FIG. 8B is a voice search selection representation.

Referring now to FIG. 8B, a voice search display 814 is illustrated. A microphone button 816 may be illuminated to indicate a voice command is waiting to be received. An audible signal may then be communicated to the wearable device.

Figure 8C:
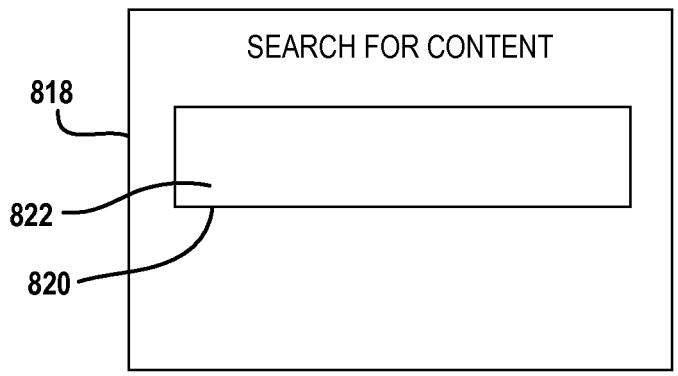
FIG. 8C is a text search representation.

Referring now to FIG. 8C, searching for content may take place entering numbers and/or letters from a user interface. A screen display 818 illustrates a text entry box 820 that may include a cursor 822 therein. By interacting with the user interface, the user may enter various letters and words that are used as search terms. The keyboard may also be used.

Figure 9A:
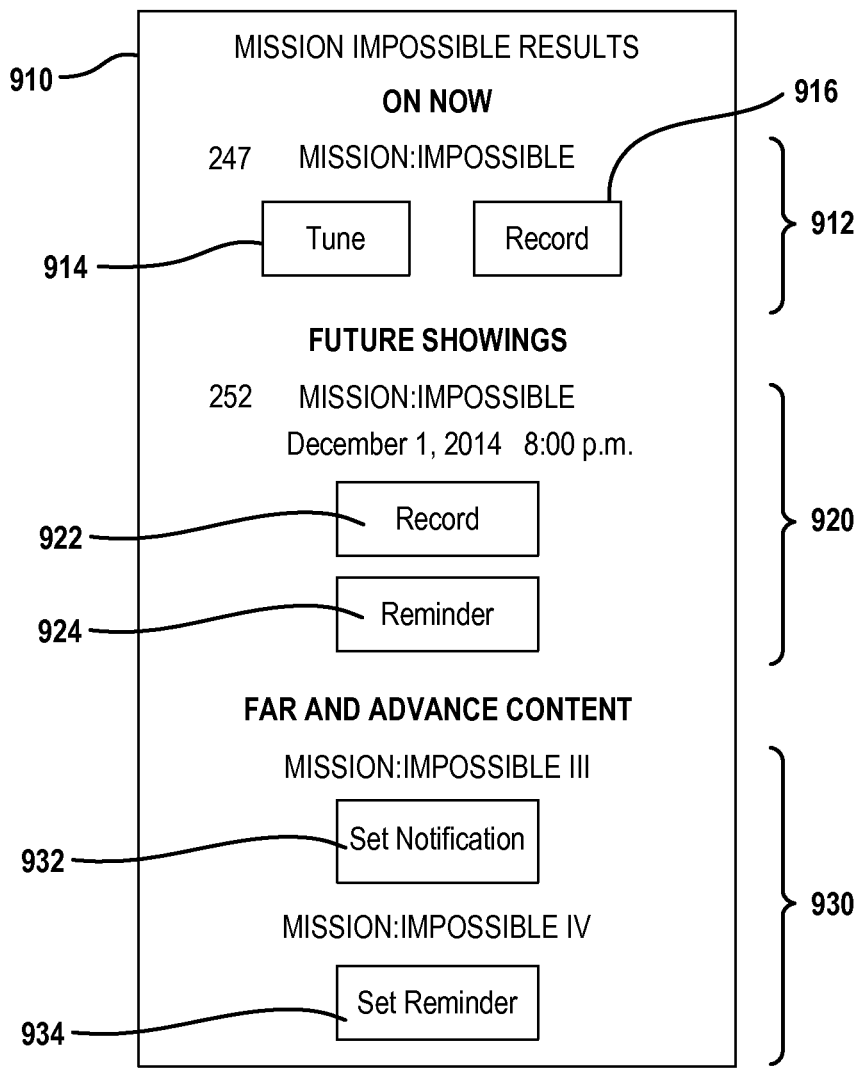
FIG. 9A is a screen display of search results.

Referring now to FIG. 9A, search results presenting several different options for content identifiers (such as content titles) are available on the search results screen display 910. If the display of the wearable device is small, only a portion of the content identifiers may be displayed at one time. The user may have to scroll to see the other portions of the screen display. It is presumed that the user input the words "Mission Impossible" in FIG. 8B or 8C. By way of an example, an "On Now" screen display portion 912 is displayed for the content identifier: Mission Impossible on channel 247. "On Now" refers to currently broadcasting content which may also be referred to as current content. A tune function selector 914 and a record function selector 916 are also displayed. The tune function selector 914 may be removed if the wearable device is not in the same local area network as the user receiving device. By interacting with a user interface of the wearable device a tune command or record command may be communicated to the user receiving device as a SHEF control command.

The screen display of FIG. 9A also includes a future showings portion 920 that, in this example, shows that channel 252 has Mission Impossible at 8 p.m. at a future date. The future showings portion 920 includes a record function selector 922 that may be selected to record the content in the future. Future showings are future content. The record command may contain a content identifier that is ultimately communicated to the user receiving device as a SHEF command to control the user receiving device. Selections may be made in the "On Now" screen display portion 912 or the "future showings" portion 920 with a user interface, touchpad or voice control.

The "future showings" portion 920 may also include a reminder function selector 924. The reminder function selector 924 may be used to set a reminder for the airing of a particular program content. The reminder function selector 924 allows the user to obtain an indicator that the content is broadcasting or is about to be broadcasted. This will be described in detail below.

A far and advance content portion may also be illustrated in the screen display 910. A set notification function selector 932 is used for setting a notification for the movie Mission: Impossible III. A set notification function selector 934 may be established in the far and advance content portion 930 of the screen display 910. The set notification function selector 934 is used to set a notification for Mission: Impossible IV. When the user selects one of the set notification function selectors 932, 934, the notification system may receive a notification selector signal that is used to set a notification query. The notification selector signal may include data corresponding to the title for which to set a notification.

Figure 9B:
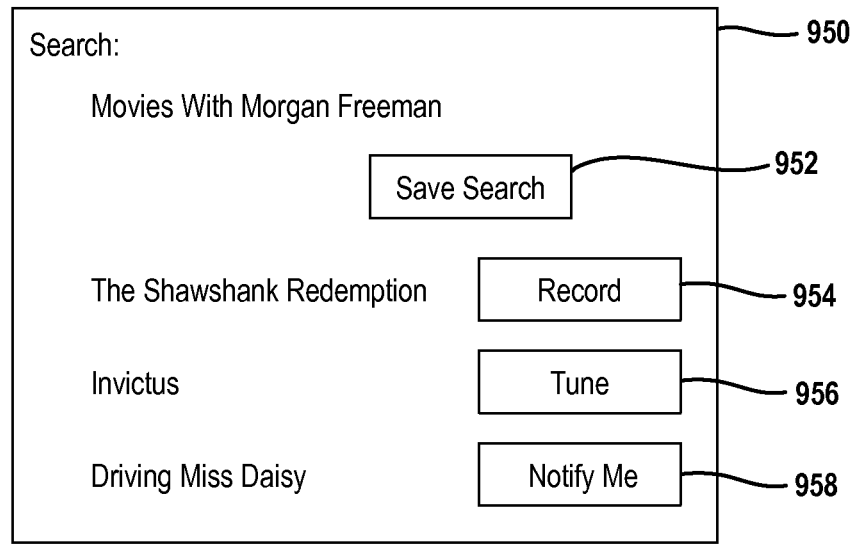
FIG. 9B is a screen display for search results relative to an actor in another example.

Referring now to FIG. 9B, a screen display 950 is illustrated for a search when an actor search is performed. In this example, the user may wish to save a search query using the function selector 952. The notification function selector 952 is used to save the search query which is communicated to the notification system. The search may be performed at predetermined frequencies and the results provided to the user in a notification. In the present example, the search terms of the query may be saved at the notification system by selecting the "save search" function selector 952. A list of movies having actor Morgan Freeman is also set forth. Various movies are set forth in the search results. THE SHAWSHANK REDEMPTION has a record selector function 954 adjacent thereto. The record selector function 954 communicates a selection signal to the head end which, in turns, communicates a conditional access packet to the user receiving device. The conditional access packet may have a channel, a transponder, an IP address or the like to allow the user receiving device to tune to the content at a predetermined time or intermediately.

INVICTUS is another movie that stars actor Morgan Freeman. In this example, a tune function selector 956 is displayed to allow the user to tune to the movie INVICTUS. In this example, the user device may be within the same local area network as the user receiving. A SHEF command may be communicated through the local area network to user receiving device to allow the user receiving device to tune to the channel having the movie INVICTUS.

Another function selector 958 is set forth corresponding to a notification function selector. The notification function selector 958 is selected to communicate a notification signal to the notification system so that when DRIVING MISS DAISY is within the program guide content data, a notification signal may be communicated to one or more of the user devices of the user's account. Of course, multiple notifications may also be communicated including emails.

In FIG. 9B, the content titles have one selector function adjacent hereto. More than one selector function may be associated with a content.

Figure 10:
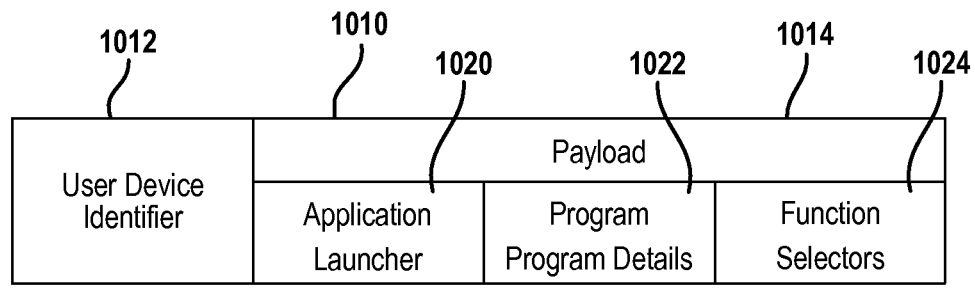
FIG. 10 is a representative of a notification signal.

Referring now to FIG. 10, a representation of a notification signal 1010 is illustrated having a user device identifier 1012 and a payload portion 1014. The user device identifier 1012 may include an IP address or other type of identifier for the user device to receive the notification. The payload portion 1014 may include an application launcher 1020, a program details portion 1022, and function selectors 1024. The payload portion 1014 may be used to generate the screen display and populate the screen display with data relative to content.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
selecting search terms to perform a search for content;
saving the search terms at a head end in response to a function selector displayed on a display of a user device and selecting the function selector to form saved search terms;
repeatedly performing searches using the saved search terms at a predetermined frequency at the head end;
generating a search result in response to the saved search terms for each of the searches repeatedly performed;
determining availability of content corresponding to the search result;
when the content corresponding to the search result is unavailable, generating on the display of the user device, a notification selector indicating the content corresponding to the search result is unavailable;
generating notification data at the user device in response to selecting the notification selector, said notification data comprising the search term or search result;
communicating the notification data to a notification system located remotely from the user device;
forming a notification query in response to the notification data;
monitoring guide data at the notification system for content corresponding to the search term or search result;
determining a target device;
generating a notification in response to monitoring guide data;
determining a device type from a user device profile module corresponding to the target device;
formatting the notification according to the device type of the target device to form a formatted notification; and
communicating the formatted notification to the target device.

2. The method as recited in claim 1 wherein performing the search comprises initiating the search from the head end.

3. The method as recited in claim 1 wherein performing the search comprises performing the search at a search module of the head end by comparing the search term to a program guide database and a program guide module.

4. The method as recited in claim 1 wherein the search term comprises a plurality of search terms.

5. The method as recited in claim 1 wherein communicating the notification data comprises communicating the notification data comprising a user device identifier and a notification type.

6. The method as recited in claim 1 further comprising communicating the search result to the user device from the head end, said user device located remotely from the head end.

7. The method as recited in claim 6 wherein communicating the search result to the user device from a head end comprises communicating the search result to a mobile device through a wireless network.

8. The method as recited in claim 1 further comprising generating content identifiers and function selectors on the screen display.

9. The method as recited in claim 1 further comprising in response to selecting a function selector performing a function at the user device.

10. The method as recited in claim 9 wherein the function comprises one or more of recording the content, tuning to content, and communicating content to the user device.

11. A system comprising:
- a user device initiating saving search terms at a head end to perform a search for content in response to selecting a function selector on a display of the user device;
- the head end saving the search terms in response to selection of the function selector to form saved search terms, and repeatedly performing a search using the saved search terms and communicating a search result in response to the search to the user device;
- the head end determining availability of the search result and when at least the search result are unavailable, communicating a notification selector to the user device;
- the user device displaying the search result and the notification function selector on a screen display, said notification function selector indicating the content corresponding to the search result is unavailable, said user device generating notification data in response to a selection of the notification selector, said notification data corresponding to the search or search result;
- said user device communicating the notification data to a notification system located remotely from the user device;
- said notification system forming a notification query in response to the notification data and monitoring guide data at the notification system for content corresponding to the search or search result, determining a target device, generating a notification in response to monitoring guide data, determining a device type from a user device profile module corresponding to the target type, formatting the notification according to the device type of the target device to form a formatted notification, and communicating the formatted notification to the target device.

12. The system as recited in claim 11 wherein the notification system is disposed within a head end.

13. The system as recited in claim 11 wherein said notification signal comprises a notification payload comprising content data.

14. The system as recited in claim 11 wherein said notification signal comprises a notification payload comprising a link to content data.

15. The system as recited in claim 11 wherein the head end comprises a search module that performs the search by comparing the search term to a program guide database and a program guide module.

16. The system as recited in claim 11 wherein the search term comprises a plurality of search terms.

17. The system as recited in claim 11 wherein the notification data comprises a user device identifier and a notification type.

18. The system as recited in claim 11 wherein the user device is located remotely from the head end.

19. The system as recited in claim 18 wherein the head end communicates the search result to the user device through a wireless network.

20. The system as recited in claim 11 wherein the screen display comprises content identifiers and function selectors.

21. The system as recited in claim 11 further comprising in response to selecting a function selector performing a function at the user device.

22. The system as recited in claim 21 wherein the function comprises one or more of recording the content, tuning to content and communicating content to the user device.

* * * * *